United States Patent [19]

Ratliff

[11] 4,099,764
[45] Jul. 11, 1978

[54] OVERHEAD DOOR LOCKING DEVICE

[75] Inventor: Roger D. Ratliff, Irving, Tex.

[73] Assignee: PepsiCo Inc., Purchase, N.Y.

[21] Appl. No.: 747,419

[22] Filed: Dec. 6, 1976

[51] Int. Cl.² ............................................. B60R 7/08
[52] U.S. Cl. .................................. 296/24 R; 292/223; 296/37.6
[58] Field of Search .................... 296/24 R, 37.6, 146; 292/345, DIG. 49, 223, 214, 217, DIG. 18

[56] References Cited

U.S. PATENT DOCUMENTS

| 703,372 | 7/1902 | Beisel | 292/DIG. 18 |
|---|---|---|---|
| 1,910,550 | 5/1933 | Kaser | 292/DIG. 18 |
| 2,331,497 | 10/1943 | Osborne | 292/223 |
| 2,471,337 | 5/1949 | Luby | 296/24 R |
| 2,764,443 | 9/1956 | Bennett | 292/217 |
| 2,857,192 | 10/1958 | Peterson | 292/223 |
| 3,135,544 | 6/1964 | Mickey | 296/24R |
| 3,352,594 | 11/1967 | Miller | 296/24 R |
| 3,786,947 | 1/1974 | Craft | 296/24 R |

Primary Examiner—Joseph F. Peters, Jr.
Assistant Examiner—John A. Carroll
Attorney, Agent, or Firm—Scully, Scott, Murphy & Presser

[57] ABSTRACT

A locking device for one or more overhead doors including a system of operatively interconnected levers adapted to be manually manipulated for imparting a closing force to the doors. The levers include a biasing member which will impart a locking force to the closed doors so as to maintain these in a fully closed and locked condition. The locking device is adapted to effect the simultaneous locking of a plurality of doors in a compartmented transport vehicle.

9 Claims, 6 Drawing Figures

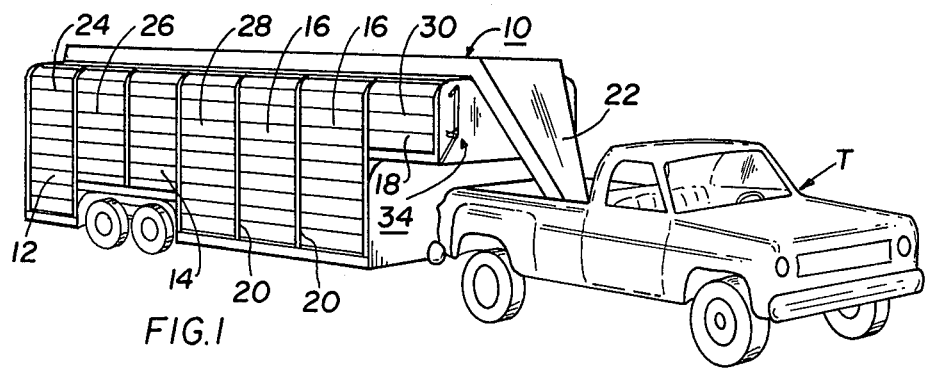
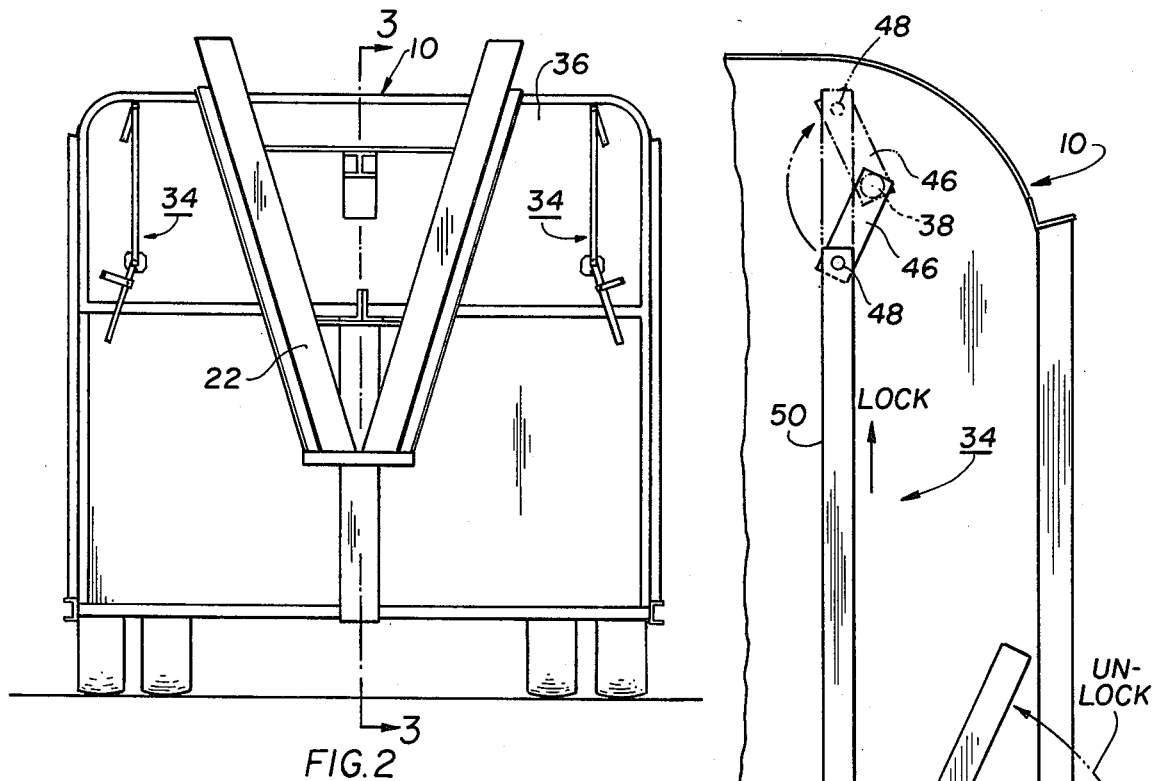
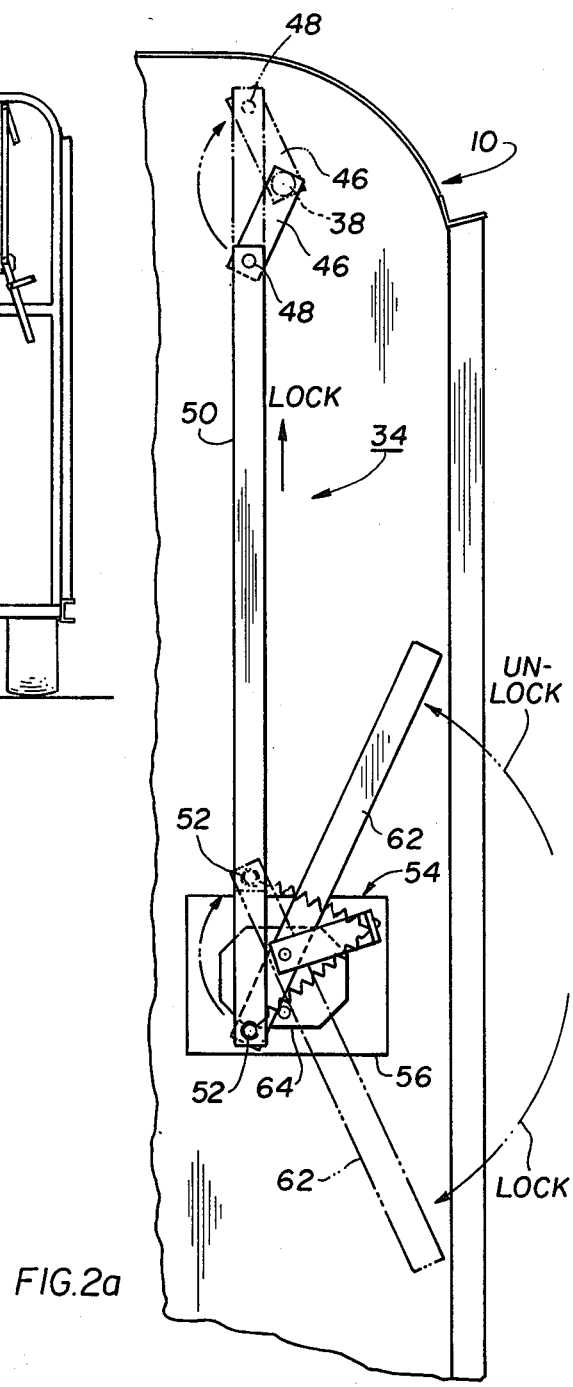

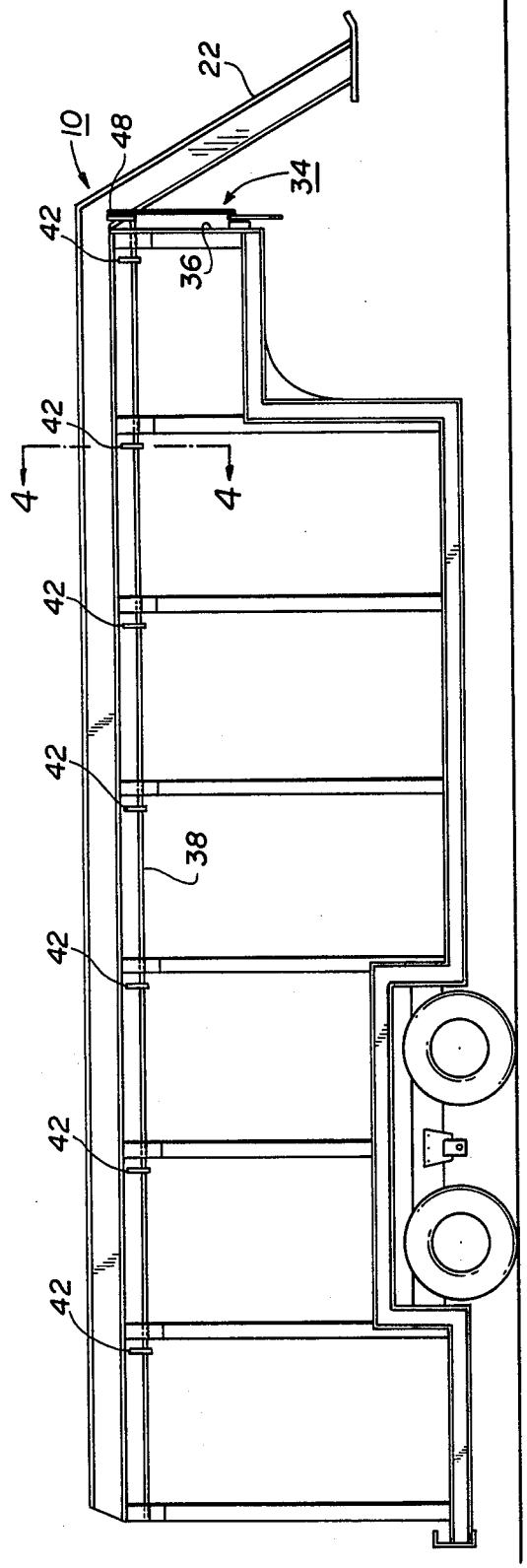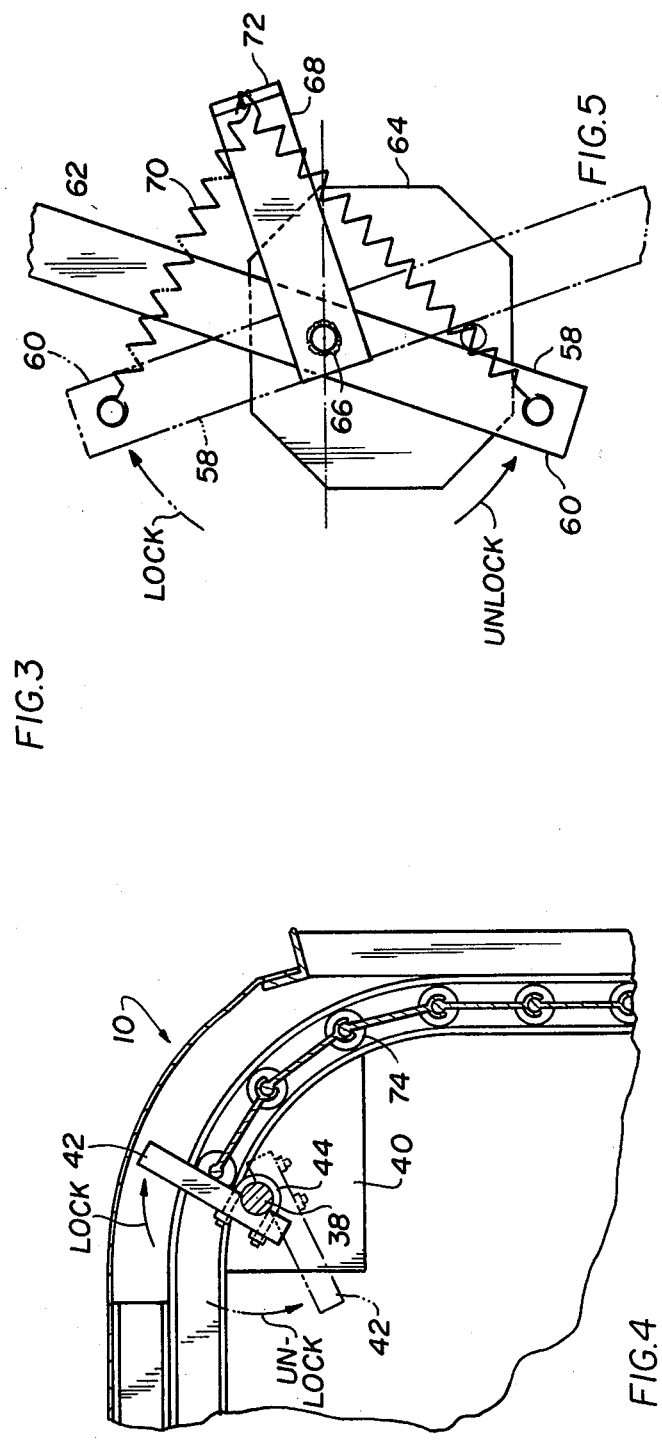

OVERHEAD DOOR LOCKING DEVICE

FIELD OF THE INVENTION

The present invention relates to a locking device for an overhead door and, more particularly, a locking device or mechanism for effectuating the positive and complete closing and simultaneous locking of a plurality of overhead doors which are employed on a transport vehicle such as, for instance, a compartmented truck.

Transport vehicles, such as compartmented trucks which are especially adapted for the conveyance of bulk goods, in particular, cases of bottled or canned beverages and the like, incorporate a plurality of roll-up or overhead doors movable within the vehicle frame structure, each of which provides access to specific storage compartments or bays in the vehicle and thereby facilitates the rapid loading and unloading of the goods. During the conveyance of the bulk goods in the transport vehicle, the overhead doors are usually maintained in a downwardly closed and locked condition in order to prevent unauthorized to and possible theft of the goods, while concurrently preventing the goods from inadvertently falling off the transport vehicle when the latter is inclined or rocked during motion of the vehicle.

Generally, after the overhead doors have been pulled down into closed position, they are locked through suitable manipulation or actuation of a locking handle which usually is located exteriorly of the vehicle, by either the driver or an assistant. This will then prevent the doors from being inadvertently or unauthorizedly opened during conveyance of the goods in the transport vehicle. However, quite frequently, the doors are not fully closed when pulled downwardly and locked, thereby leaving a gap of up to a few inches between the frame structure forming the compartment floor and the bottom edge of the closed overhead door. This gap may be conducive towards enabling the possible theft of the goods by jimmying of the door upwardly through insertion of a prying tool into the space remaining between the bottom of the door and the vehicle frame. Moreover, the failure of any door to be fully closed may subject the goods conveyed in that particular vehicle compartment or bay to inclemencies of the weather and, in general, impart an unattractive aesthetic appearance to the transport vehicle or truck.

DISCUSSION OF THE PRIOR ART

Basically, roll-down or overhead doors for transport vehicles, such as compartmented trucks for the storage and conveyance of bulk goods, are well known in the art, for instance, as disclosed in Mickey et al U.S. Pat. No. 3,135,544 and illustrating a compartmented vehicle or truck body of the type described herein, which incorporates a plurality of upwardly rollable doors, each of which affords access to, respectively, a compartment or storage bay in the truck.

Similarly, Poorman et al U.S. Pat. No. 2,250,604 discloses a transport vehicle showing an upwardly rolling door construction which is constituted by a plurality of horizontally extending hinged-together door sections. Neither of these known door constructions disclose a locking device or mechanism which will afford the positive closing and locking of the vehicle door or doors in a fully downwardly closed and locked condition.

Furthermore, door locking devices for overhead doors are presently known, such as the device described and illustrated in Buehner U.S. Pat. No. 2,393,287, which discloses a lock rod arrangement for locking a downwardly closed overhead door in a fully closed position through the intermediary of sideways or horizontally extending locking pins adapted to engage the door frame structure.

Gore U.S. Pat. No. 2,962,315 describes a locking mechanism providing for the simultaneous locking or unlocking of a plurality of doors which are in a single row, through manipulation of a single actuating mechanism.

However, none of these U.S. patents disclose nor even suggest a locking device or mechanism for an overhead door of the type described which, concurrently with affording the locking of the door or doors, will impart positive action to the latter so as to cause each door to be positively and firmly biased into and maintained in a fully downwardly closed position and to eliminate the formation of any gap between the bottom of the door and the vehicle frame structure which is adapted to be contacted thereby.

SUMMARY OF THE INVENTION

In clear contrast with the locking devices and mechanisms for the overhead or roll-down doors of transport vehicles encountered in the prior art, the present invention provides for a locking device which will, in a firm and positive manner, assure the complete closure and locking of one door, or simultaneously of a plurality of doors, through the manipulation of a single locking actuating mechanism on the vehicle body.

In order to attain the foregoing, the present invention contemplates a provision of a locking device or mechanism for one or more overhead doors each being constituted of a plurality of hinged-together sections which are vertically slidable within a tracked door frame structure affording upwardly opening and downwardly closing of the door. The locking device includes a generally horizontal rod member which is rotatably journaled in the vehicle frame structure so as to extend in parallel closely spaced relationship along the upper edge of each door in the downwardly closed position of the latter, which rod member has mounted thereon for concomitant rotation at least one projecting finger member radially extending therefrom adapted to engage the upper edge of an associated closed door, and further includes a depending elongate lever having one end thereof pivotally connected to an arm which is rigidly fastened to and radially extends from one end of the rod member, the other end of the lever being pivotally connected to a manually actuatable mechanism which will effectuate pivoting of the projecting finger member either into or out of engagement with the upper edge of the closed overhead door. Moreover, the manually actuatable mechanism incorporates biasing means, preferably in the form of a tension spring adapted for over-the-center displacement, being incorporated in the actuating mechanism for imparting a biasing force to the projecting finger member and thereby causing the latter to positively urge the overhead door associated therewith into its fully downwardly closed position and to maintain it in that condition.

In a preferred embodiment of the invention, the rod member is of a length extending over the width of a plurality of overhead doors which are in an aligned or series arrangement providing closures for a row or plurality of goods-storing compartments for a transport vehicle, such as bays for receiving cases of soft drink bottles and the like, wherein the rod member has a plurality of the projecting finger members mounted thereon in axially spaced relationship, each adapted to engage the upper edge of respectively one of the overhead doors in the downwardly closed position thereof, to thusly effect the simultaneous closing and concurrent locking of the plurality of doors by means of a single inventive locking device or mechanism.

Accordingly, it is a primary object of the present invention to provide a locking device for an overhead door which will assure the complete closing and positive locking of the door in the downwardly closed position thereof.

Another object of the present invention is to provide a locking device of the type described, adapted to be employed on a compartmented transport vehicle having a plurality of overhead doors, which will for the simultaneous locking of the plurality of doors through manipulation of a single actuating mechanism.

Yet another object of the present invention is to provide a locking device of the type described which incorporates biasing means causing the overhead door or doors to be completely closed and locked in a firm and positive manner.

BRIEF DESCRIPTION OF THE DRAWINGS

These and other objects of the invention may now be more readily ascertained by reference to the following detailed description of a preferred embodiment of a locking device for overhead doors constructed pursuant to the present invention, taken in conjunction with the accompanying drawings; in which:

FIG. 1 is a perspective view of a transport vehicle including a plurality of overhead doors and incorporating at least one locking device constructed pursuant to the present invention;

FIG. 2 is a front elevational view of the transport vehicle of FIG. 1;

FIG. 2a is an enlarged fragmentary portion of the transport vehicle shown in FIG. 2;

FIG. 3 is a sectional view taken along line 3—3 in FIG. 2;

FIG. 4 is a sectional view taken along line 4—4 in FIG. 3; and

FIG. 5 is an enlarged detailed view of the actuating mechanism of the locking device.

DETAILED DESCRIPTION

Referring now in detail to the drawings, and particularly FIG. 1, a transport vehicle 10 comprises a compartmented frame structure providing a plurality of bays 12, 14, 16 and 18 for receiving and storing bulk goods, such as cases of bottled or canned soft drinks, which are formed by a plurality of structural members 20. The vehicle 10 is adapted to be connected to a tractive member or cab T by means of a suitable "gooseneck" structure 22. The basic frame structure for a transport vehicle 10 of this type is illustrated and described in U.S. Pat. No. 4,043,569, the disclosure of which is incorporated herein by reference.

Each of the compartments or bays may be closed to the outside of the vehicle by means of suitable overhead or roll-down doors 24, 26, 28 and 30. Each of the doors is constructed of a plurality of superimposed hinged-together sections, and may be constituted of a suitable material such as aluminum, steel or the like. The opposite side of the transport vehicle which is not visible in FIG. 1 of the drawings is essentially a mirror-image of the illustrated side, and may be provided with similar compartments adapted to be closed by means of a plurality of overhead or rolldown doors.

For locking of the overhead doors on either side of the transport vehicle in their downwardly closed position there is provided a locking device 34 which preferably is mounted on a front wall 36 of the transport vehicle 10. Identical, mirror-image locking devices 34 are provided for the doors on both sides of the transport vehicle, each device being adapted to lock the respective overhead doors on that particular side of the vehicle. In view of the similar constructions and similarity of operation, only one locking device is described hereinbelow.

In essence, each locking device 34, having specific reference to FIGS. 2, 2a, 3 and 4 of the drawings, consists of an elongate rod member 38 which extends along substantially the full length of the interior of the transport vehicle, being rotatably journaled and supported in suitable brackets or support plates 40 forming part of the transport vehicle frame structure. The rod member 38 extends generally horizontally along the upper interior corner of the transport vehicle 10 in closely spaced parallel relationship with the upper edge of the overhead doors when the latter have been pulled (manually) into downwardly closed positions, as shown in FIG. 1 and in detail in FIG. 4 of the drawings.

Fastened rigidly in the rod member 38 for concomitant rotation therewith are radially extending plates or projecting fingers 42, which preferably are clamped to the rod member 38 by means of a suitable U-bolt arrangement 44 which will restrain the projecting finger 42 from rotation relative to the rod member 38 while allowing for the axial adjustment thereof to any predetermined fixed position along the length of rod member 38. As shown in FIG. 3 of the drawings, a projecting finger 42 is positioned in proximity with the upper edge of respectively each door of each vehicle compartment. Quite obviously, more than one projecting finger 42 may be mounted on rod member 38 in axial alignment with the upper edge of any one particular overhead door.

As may be ascertained from FIG. 3 of the drawings, at least the forward end of the lock rod member 38 extends exteriorly of the transport vehicle. A short, radially extending lever arm or projection 46 is rigidly fastened to the forward, exteriorly positioned end of the rod member 38 so as to be concomitantly rotatable therewith. Pivotally connected to the free distal end of the lever arm 46, through intermediary of a suitable pivot pin 48, is a generally vertically depending elongate lever 50 extending in parallel spaced relationship with the front surface 36 of the transport vehicle 10. The lower or remote end of the lever 50 is pivotally connected, by means of a suitable pivot pin 52, to an actuating and lock handle mechanism 54, shown on an enlarged scale in FIG. 5 of the drawings and described in detail hereinbelow.

The actuating mechanism 54 for the door locking device 34 comprises a plate 56 which is suitably fastened through bolts, screws, or the like, to the front wall 36 of the transport vhicle. An actuating lever 58 includes a first lever portion 60 having one end thereof pivotally connected to the lever 50 by means of a pivot pin 52, and has its other lever portion 62 forming a hand grip or handle for manual manipulation thereof. The lever 58 is rotatable relative to the bracket or plate 56 and superimposed mounted plate 64 by means of a fixed pivot pin 66 about which it rotates. Fastened to the pivot pin 66 so as to be restrained from rotation is a short mounting element or arm 68 outwardly of lever 58, which includes a curved outer end 72 apertured so as to be interconnected to the distal end of the portion 60 of lever 58 by means of a tension spring 70. In effect, when the handle or gripping portion 62 of the lever 58 is pivoted about pin 66, the tension spring 70 is subjected to an over-the-center motion through a horizontal center line passing through pin 66.

The operation of the locking device 34 is as follows:

In order to allow for the manual upwardly opening or downwardly closing movement of the overhead doors along the right side of the vehicle 10, the lever portion or handle 62 illustrated on that side of the front surface 36 of the transport vehicle, as shown in FIG. 2a, is pivoted in a counter-clockwise direction about fixed pivot 66 so as to assume the position shown in solid lines in FIG. 5. In turn, this will cause the lever 50 to be pulled downwardly and, correspondingly, cause the lever arm 46 to undertake a counter-clockwise rotation about pivot point 48. Concurrently, this will impart a counter-clockwise rotation to the rod member 38, as viewed from the front of the transport vehicle, having reference to FIG. 4 of the drawings, and cause the projecting finger 42 to assume the position shown in phantom lines in that figure of the drawings. In effect, this will then permit the unhindered upward or downward displacement of the overhead doors within their respective tracks in the vehicles frame structure, with the rollers 74 providing the necessary guiding traction for the doors in the vehicle frame. When it is desired to close and lock the collective overhead doors on any particular side of the vehicle, it is necessary to manually grip the doors through suitable handles (not shown) provided on the external surfaces of the doors and to pull the doors downwardly until they closely approach the bottom trellis of the vehicle frame. Thereafter, the hand grip 62 on the actuating mechanism 54 is rotated in a clockwise direction about pivot point 66, causing the lever arm 50 to shift upwardly in the direction marked "lock" in FIG. 2a, and in response thereto causing the lever arm 46 and rod member 38 to pivot in a clockwise direction. This will rotate each projecting finger 42 to rotate clockwise concomitantly with rod member 38 and pivot into engagement with the upper edge of the overhead door with which it is associated, and tend to push the door downwardly into its fully closed position. In order to assure that the doors are biased into fully closed and locked positions, the biasing spring 70 imparts rotational force to the actuating mechanism 54, causing the latter to maintain the doors fully closed since the spring will have passed across its over-the-center position to a first position wherein it urges the apparatus to close and lock the doors. Since a projecting finger 42 is mounted on the rod member 38 for each respective door along that particular side of the transport vehicle, all of the doors will be simultaneously fully closed and biased into locked positions. Unlocking of the device 34 is effected by rotation of handle 62 in the opposite direction and causing the spring 70 to move over-the-center into its second stationary mode, or door unlocking position.

The locking device 34 provided on the opposite side of the transport vehicle, namely, the left side thereof in FIG. 2, is an identical mirror-image of the locking device 34 described hereinabove and operates in a similar manner with the only difference being that the mechanism operates to lock the doors when rotated in the opposite direction.

Although not specifically shown herein, the handle 62 may include means, such as an eyelet or the like, adapted to cooperate with a suitable element on the surface 36 for locking the handle against motion, i.e. through the use of a padlock.

From the foregoing, it quite readily appears that the present invention provides a door locking device of simple and economical construction while assuring the complete and positive closing and locking of the transport vehicle doors.

What is claimed is:

1. A locking device for at least one overhead door which includes a plurality of superimposed hinged-together sections to fit in a frame structure having door-supporting tracks, the sides of the door being supported and slidable within said tracks for upwardly opening and downwardly closing movements of the door, said locking device comprising:
    (a) an elongate rod member mounted to extend in closely spaced parallel relationship with the upper edge of the door in the downwardly closed position of the latter, said rod member being supported by said frame structure for rotation about its longitudinal axis; radially projecting means being fastened to said rod member for concomitant rotation therewith intermediate the ends thereof so as to be pivotable into and out of engagement with the upper edge of the downwardly closed door;
    (b) radially extending arm means having one end thereof rigidly fastened to one end of said rod member, said arm means being rotatable conjointly with said rod member;
    (c) elongate lever means having a first end thereof pivotally connected to the distal end of said arm means;
    (d) and actuating means mounted on a fixed support on said frame structure operatively connected to a second end of said elongate lever means, said actuating means including a pivotable lever fastened to said fixed support and having first and second lever arm portions extending oppositely radially thereof, the distal end of said first lever arm portion being pivotally connected to said second end of said elongate lever means and said second lever arm position forming a handle portion for imparting rotational movement thereto, rotation of said pivotable lever in a predetermined direction causing said elongate lever means to rotate said rod member and the radially projecting means and the latter to engage the upper edge of an associated closed door; and biasing means operatively interconnecting the pivot between said elongate lever means and first lever arm portion and a projection mounted on said fixed support so as to impart a biasing force to said pivotable lever portion in the direction of rotation thereof whereby said biasing force is transmitted through said elongate lever means to said rod member and radially projecting means to cause the latter to push and maintain said closed door in a fully downwardly closed and locked condition.

2. A locking device as claimed in claim 1, wherein said biasing means comprise a tension spring.

3. A locking device as claimed in claim 2, wherein said tension spring interconnects said first lever arm portion and said projection for effecting over-the-center movements responsive to rotation of said pivotable lever.

4. A locking device as claimed in claim 1, wherein said at least one overhead door is mounted on a vehicle body providing at least one compartment for the storage of goods, said device being supported on frame portions of said vehicle body adjacent said door.

5. A locking device as claimed in claim 4, including a plurality of overhead doors positioned in contiguous and coplanar relationship, said rod member being of a length commensurate with the collective width of said plurality of doors; and a plurality of said radially projecting means being fastened to said rod member in axially spaced relationship, at least one of each of said radially projecting means being in axial alignment with respectively one of said doors whereby said locking device is adapted to simultaneously lock said plurality of doors.

6. A locking device as claimed in claim 5, wherein said overhead doors are mounted on a vehicle body providing a plurality of compartments for the storage of goods, said device supported on end walls of said vehicle adjacent an endmost one of said plurality of said doors.

7. In a locking device for locking at least one overhead door in a downwardly closed position, a plurality of articulated operatively interconnected levers; a stationarily positioned mounting element; means for locking said door responsive to predetermined manipulation of said levers; and a tension spring biasing means, operatively interconnecting a pivot between two of said articulated, operatively interconnected levers and said stationarily positioned mounting element, for effecting an over-the-center movement between a first position of the spring, wherein the tension spring urges the levers into first positions to lock said door into a fully closed locked position, and a second position of the spring wherein the tension spring urges the levers into second positions wherein the door is unlocked.

8. A locking device as claimed in claim 7, including a plurality of doors adapted to be simultaneously locked by said levers.

9. A locking device as claimed in claim 7, for use in locking at least one overhead door of a transport vehicle.

* * * * *